United States Patent
Zheng et al.

(10) Patent No.: US 11,537,187 B2
(45) Date of Patent: Dec. 27, 2022

(54) SYNCHRONIZATION OF POWER SUPPLY DEVICES

(71) Applicant: HEWLETT PACKARD ENTERPRISE DEVELOPMENT LP, Houston, TX (US)

(72) Inventors: Jiguang Zheng, Beijing (CN); Yuying Chen, Beijing (CN); Bo Wang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 1 day.

(21) Appl. No.: 17/226,435

(22) Filed: Apr. 9, 2021

(65) Prior Publication Data

US 2022/0326751 A1    Oct. 13, 2022

(51) Int. Cl.
| | |
|---|---|
| *H04B 3/00* | (2006.01) |
| *G06F 1/26* | (2006.01) |
| *G06F 1/12* | (2006.01) |
| *H04W 56/00* | (2009.01) |

(52) U.S. Cl.
CPC ............... *G06F 1/266* (2013.01); *G06F 1/12* (2013.01); *H04W 56/00* (2013.01)

(58) Field of Classification Search
CPC .......... G06F 1/266; G06F 1/12; H04W 56/00
USPC ...................................... 340/425.2
See application file for complete search history.

(56) References Cited

U.S. PATENT DOCUMENTS

| | | | |
|---|---|---|---|
| 10,338,229 B2 | 7/2019 | Levy et al. | |
| 10,868,575 B2 * | 12/2020 | Stählin | H04B 1/3877 |
| 11,146,103 B1 * | 10/2021 | Davies | H02J 3/383 |
| 11,171,766 B2 | 11/2021 | Zheng et al. | |

(Continued)

FOREIGN PATENT DOCUMENTS

| | | |
|---|---|---|
| CN | 101667010 | 3/2010 |
| CN | 102075330 | 5/2011 |

(Continued)

OTHER PUBLICATIONS

Hasan, K. F. et al., "GNSS Time Synchronization in Vehicular Ad-Hoc: Benefits and Feasibility," IEEE Transactions on Intelligent Transportation Systems, Mar. 7, 2018, vol. 19, No. 12; pp. 3915-3924, https://arxiv.org/ftp/arxiv/papers/1811/1811.02741.pdf.

(Continued)

*Primary Examiner* — Don N Vo
(74) *Attorney, Agent, or Firm* — Hewlett Packard Enterprise Patent Department

(57) ABSTRACT

Examples relate to communicating synchronization information from a satellite to a power supply device to enable time synchronization between the satellite and the power supply device. The power supply device includes a port to receive, from a modulator, a modulated current corresponding to a power consumption across a dummy load, where a level pattern of the modulated current indicates the synchronization information received from the satellite. The power supply device includes a power consumption analyzer configured to receive a modulated voltage, across a shunt resistor, corresponding to the modulated current and recover, from the modulated voltage, the synchronization information.

16 Claims, 5 Drawing Sheets

(56) References Cited

U.S. PATENT DOCUMENTS

| | | | |
|---|---|---|---|
| 2009/0309792 A1* | 12/2009 | Hanabusa | G01S 19/34 |
| | | | 342/357.63 |
| 2010/0135336 A1 | 6/2010 | Zhou et al. | |
| 2013/0195116 A1 | 8/2013 | Thorburn | |
| 2020/0007181 A1 | 1/2020 | Stahlin et al. | |

FOREIGN PATENT DOCUMENTS

| | | |
|---|---|---|
| RU | 172628 | 7/2017 |
| WO | WO03081810 | 10/2003 |
| WO | WO-2016045314 A1 | 3/2016 |
| WO | WO-2018101369 A1 | 6/2018 |

OTHER PUBLICATIONS

Guo, H. et al., "Design of a Time Synchronization System based on GPS and IEEE 1588 for Transmission Substations," IEEE Transactions on Power Delivery, 2017, vol. 32, No. 4, pp. 2091-2100, https://www.research.manchester.ac.uk/portal/files/51486209/IEEE_Trans_on_Power_Delivery_Hao_Guo_27_03_2016_v3_Final.pdf.

Advanced Navigation, "GNSS Compass Reference Manual," Version 1.0, Jan. 23, 2018, 83 pages.

Crossley, P. A. et al., "Time Synchronization for Transmission Substations Using GPS and IEEE 1588," CSEE Journal of Power & Energy Systems, vol. 2, No. 3, Sep. 2016, pp. 91-99.

\* cited by examiner

SYNCHRONIZATION OF POWER SUPPLY DEVICES

BACKGROUND

Power over Ethernet (PoE) allows an Ethernet cable to be used for both power transmission and data transmission. Devices such as Voice over Internet Protocol (VoIP) phones, Light-Emitting Diode (LED) lights, Internet Protocol (IP) cameras, and Bluetooth Low-Energy (BLE) beacons can be powered by PoE and be installed in locations where it would be impractical or expensive to install conventional wires used to provide power. A number of industry standards exist for systems utilizing PoE functionalities (i.e., PoE systems). For example, the Institute of Electrical and Electronics Engineers (IEEE) has defined certain industry standards in IEEE 802.3 for Ethernet-based networks. In the IEEE standards, a device that receives PoE is called a Powered Device (PD), while a device (e.g., an access point, switch or the like) that provides PoE is called a Power Sourcing Equipment (PSE).

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
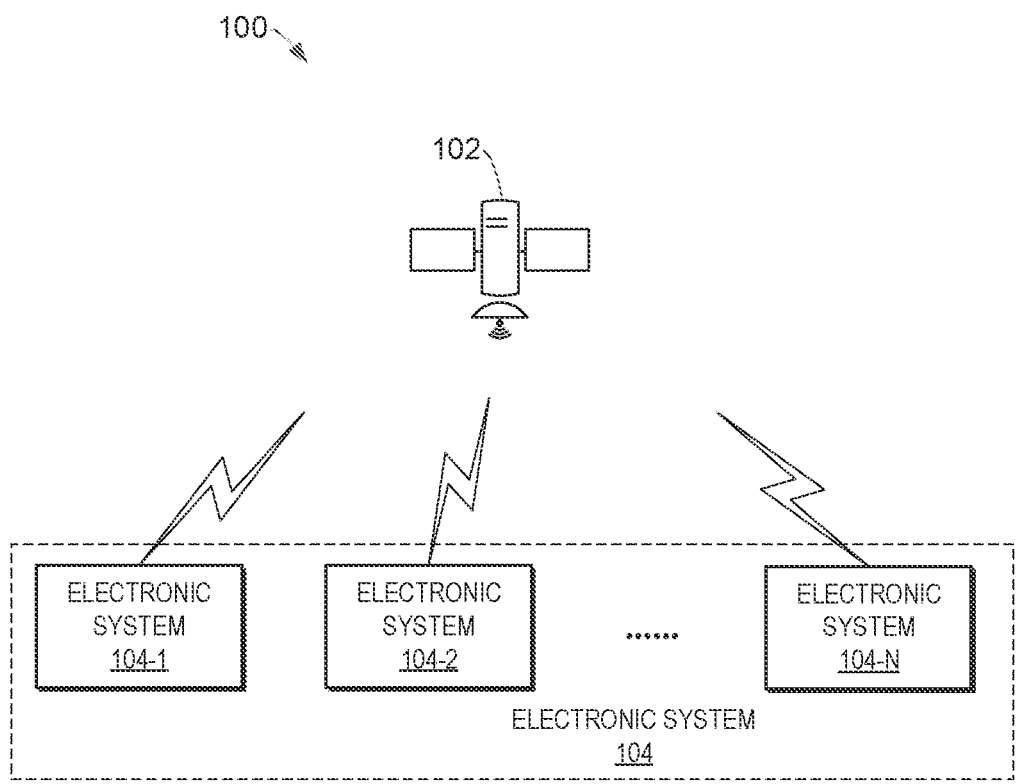
FIG. 1 is a block diagram illustrating an environment including a satellite and electronic systems, in accordance with one example.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The presence of broadening words and phrases such as "one or more," "at least," "but not limited to" or other like phrases in some instances shall not be read to mean that the narrower case is intended or required in instances where such broadening phrases may be absent.

In industrial network deployments such as enterprise networks or data center networks (DCNs), hundreds or thousands of devices may be connected to a network via network devices such as wireless access points. Such network devices may be synchronized with respect to location and/or time for various applications (e.g., mobile service, fixed satellite services) in accordance with various industry standards (e.g., Wi-Fi Alliance and IEEE Standards Association). In some examples, for Wi-Fi 6 (IEEE 802.11ax), network devices may need to be synchronized with respect to location to prevent interferences according to Automated Frequency Coordination (AFC). In some examples, with the development of Wi-Fi 7 (IEEE 802.11be), network devices may need to be synchronized with respect to time to enable and/or maintain coordination among the network devices.

Network devices to be synchronized may be equipped with respective satellite receivers such as Global Positioning System (GPS) receivers to acquire synchronization information from satellite signals. However, if a network device is located in an indoor environment, the acquisition of the synchronization information included in the satellite signals will be impacted due to the weak signals (e.g., the signals with weak signal strength) received in the indoor environment. In such instances, it may not be efficient to receive the synchronization information by the satellite receiver equipped within the network device that is located in the indoor environment.

Further, various specifications or configurations may be used for synchronizing network devices with respect to time in accordance with various industry standards. For example, Precision Time Protocol (PTP), also referred to as IEEE 1588, may be used to synchronize clocks of network devices. However, the accuracy of synchronization enabled by IEEE 1588 may be limited due to its complicated architecture and/or the synchronization process. For example, a network utilizing PTP may include an intermediate component such as a boundary clock between a master component including a GPS receiver and a network device, such that synchronization between the network devices requires a series of messages to be transmitted between the master component and the network device. In such examples, a transmission delay (e.g., 300 nanoseconds (ns)) between the master component and the network device impacts the accuracy of the synchronization of the network devices.

To address these issues, the present disclosure provides examples for efficiently communicating synchronization information from a satellite to a power supply device that is deployed in an indoor environment to enable synchronization between the power supply device and the satellite. A power supply device is a network device (e.g., a wireless access point) that is configured to supply power to an electronic device. In an example, the power supply device is a network device that provides PoE power and/or data transmissions to a PD. In particular, example systems and devices described herein communicate time information to a given power supply device to enable time synchronization between the power supply device and the satellite with high accuracy due to small transmission delays (e.g., less than 50 ns). When multiple network devices (power supply devices) deployed in a network are synchronized with the satellite, all network devices may be synchronized with one another.

In accordance with some aspects, a power supply device may include a port to receive, from a modulator, a modulated current corresponding to a power consumption across a dummy load. A level pattern of the modulated current may indicate synchronization information received from a satellite. The power supply device may include a power consumption analyzer configured to receive a modulated voltage, across a shunt resistor, corresponding to the modulated current and recover the synchronization information from the modulated voltage to enable synchronization between the satellite and the power supply device based on the synchronization information In accordance with some aspects, an electronic system may be presented. The electronic system may include an electronic device and a power supply device. The electronic device may be coupled to the power supply device. The electronic device may include a receiver to receive a signal (i.e., satellite signal) from a satellite and generate a pulse signal based on the signal received from the satellite. The electronic device may be deployed at a location (e.g., in an outdoor environment) such that the receiver can efficiently (e.g., with good signal strength) receive the satellite signals. The electronic device may include a modulator configured to receive the pulse signal from the receiver and generate a modulated current corresponding to a power consumption across a dummy load. A level pattern of the modulated current may be indicative of synchronization information (e.g., the time information) included in the satellite signal. The electronic device may include a first port to receive the modulated current from the modulator and transmit the modulated current to the power supply device. The power supply device may include a second port to receive the modulated current from the first port of the electronic device. The power supply device may include a power consumption analyzer that may be configured to receive a modulated voltage across a shunt resistor corresponding to the received modulated current by the power supply device from the electronic device. A level pattern of the modulated voltage may be indicative of the synchronization information (e.g., the time information) included in the satellite signal. The power consumption analyzer may be configured to recover the synchronization information from the modulated voltage. In an example, the power consumption analyzer may include a demodulator to recover the synchronization information. Once the power consumption analyzer recovers the synchronization information, the power supply device may align its local time information based on the recovered synchronization information to be synchronized with the satellite.

Unless specified or limited otherwise, the term "a level pattern of a current" and variations thereof (e.g., level pattern of a modulated current) refer to a pattern that includes at least two current levels modulated in a manner of amplitude modulation. Unless specified or limited otherwise, the term "a level pattern of a voltage" and variations thereof (e.g., level pattern of a modulated voltage) refer to a pattern that includes at least two voltage levels modulated in a manner of amplitude modulation.

In the examples described herein, as transmission delays may be stable, predictable and small (e.g., less than 50 ns) due to the simplicity of the circuit structures of the electronic device and the power supply device, time information determined based on the recovered synchronization information may be corrected to determine time information (i.e., corrected time information) transmitted by the satellite with high accuracy. In some examples, the power supply device may align its local time information based on the corrected time information. As a result, the power supply device may be accurately synchronized with the satellite. When all network devices (power supply devices) deployed in the network are accurately synchronized with the satellite, all network devices may be synchronized with one another. In this manner, the examples described herein provide synchronization of network devices deployed in indoor environments with high accuracy.

Referring now to the drawings, FIG. 1 is a block diagram illustrating an example environment 100 in which the technology described herein may be implemented. The environment 100 may include a satellite 102 and electronic systems 104-1, 104-2, . . . , 104-N (hereinafter collectively referred to as "electronic systems 104"), where N represents an integer greater than zero. The satellite 102 may be a satellite of the global navigation satellite system (GNSS), such as, but not limited to, a GPS system or Galileo satellite navigation system. In some examples, at least one of the electronic systems 104 may be a PoE system. A PoE system is a system that utilizes PoE functionalities for power and/or data transmissions as defined by certain industry standards in IEEE (e.g., IEEE 802.3) for Ethernet-based networks. The PoE system includes a power supply device that provides PoE and a device that receives PoE from the power supply device. The device that receives PoE is called as a powered device (PD). The power supply device that provides PoE to a PD is called a Power Sourcing Equipment (PSE).

In certain examples, each electronic system 104 may be a PoE system. In other examples, the environment 100 may include one or more electronic systems 104 that can be any suitable systems other than PoE.

The electronic system 104 may include an electronic device and a power supply device coupled to the electronic device. The electronic device may include a receiver to receive a signal (i.e., satellite signal) from a satellite and generate a pulse signal based on the signal received from the satellite, a modulator to receive the pulse signal from the receiver and generate a modulated current corresponding to a power consumption across a dummy load, and a first port to receive the modulated current from the modulator and transmit the modulated current to the power supply device. The power supply device may include a second port to receive the modulated current from the electronic device. The power supply device may include a power consumption analyzer that may be configured to receive a modulated voltage across a shunt resistor corresponding to the received modulated current by the power supply device from the electronic device. A level pattern of the modulated voltage may indicate the synchronization information (e.g., the time information) included in the satellite signal. The power consumption analyzer may be configured to recover the synchronization information from the modulated voltage. An example of the electronic system 104 and communication of the synchronization information from the electronic device to the power supply device is described below with reference to FIG. 2.

Figure 2:
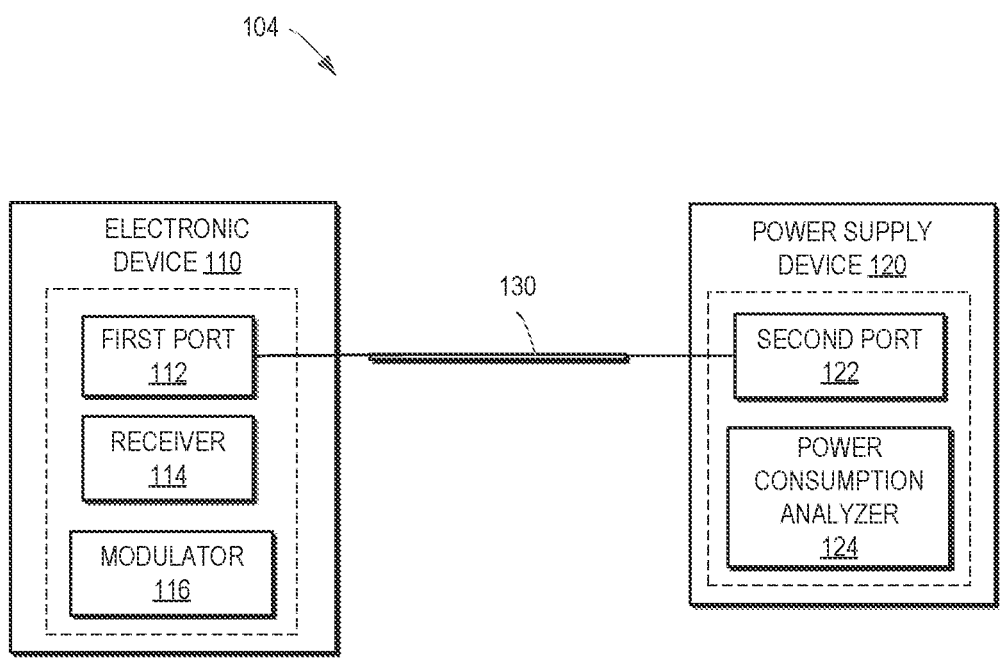
FIG. 2 is a block diagram illustrating an electronic system including an electronic device and a power supply device, in accordance with one example.

FIG. 2 illustrates an example electronic system 104 in accordance with some examples. The electronic system 104 includes an electronic device 110, a power supply device 120 and a connection or link 130. The electronic system 104 may operate at a constant voltage, for example, in a range between 44 volts and 57 volts, in accordance to standards of IEEE. In some examples, the power supply device 120 may be deployed in an indoor environment for example, inside of a building, whereas the electronic device 110 may be deployed in an outdoor environment for example, outside of the building. Although FIG. 2 shows one electronic device 110 coupled to the power supply device 120 through the connection 130, more than one electronic device may be coupled to the power supply device 120 through a respective connection.

The connection 130 may be a cable, such as, but not limited to, a category 5 (CAT5), category 5 enhanced (CAT5E), or category 6 (CAT6) cable. The connection 130 may be set up between a first port 112 of the electronic device 110 and a second port 122 of the power supply device 120. An example of the first port 112 or the second port 122 includes, but is not limited to, a terminal, for example, an RJ45 terminal.

In the example of FIG. 1, the power supply device 120 is a network device that is configured to supply power to the electronic device 110. For instance, the power supply device 120 is a network device that operates as a PSE to provide PoE power and/or data transmissions to a PD. A network device (e.g., power supply device 120) may engage in any network data transmission operations, including, but are not limited to, switching, routing, bridging, or a combination thereof. In some examples, the power supply device 120 may comprise a wireless access point (WAP). Other examples of the power supply device 120 may include, but are not limited to, a switch, base station for cellphones, or the like. In examples described herein, a "WAP" generally refers to receiving points for any known or convenient wireless access technology which may later become known. Specifically, the term WAP is not intended to be limited to WAPs which conform to IEEE 802.11 standards. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that the power supply device 120 may be any suitable type(s) of network devices made by any suitable manufacturer(s).

In an example, the power supply device 120 is a network device (e.g., WAP) that is configured to operate as a power sourcing equipment (PSE), i.e., to provide PoE data and/or power transmissions to a powered device (PD). In such examples, the power supply device 120 may be referred to as a POE enabled network device. It is to be noted that although the power supply device 120, as illustrated herein, may be a PoE enabled network device, the power supply device 120 may be a PoE injector, in some examples. A PoE injector connects a PoE enabled network device to a local area network (LAN) switch port and uses an existing LAN cabling to deliver power as well as data.

The electronic device 110 may be a powered device (PD) such as an Internet Protocol (IP) camera, light emitting diode (LED) light source, or the like. The electronic device 110 includes a receiver 114 including an antenna that can receive satellite signals. In an example; the receiver 114 may be a satellite receiver such as a Global Navigation Satellite System (GNSS)) which receives signals (also referred to as satellite signals) from the satellite 102 (FIG. 1). Although the electronic device 110 is described as being deployed in an outdoor environment for receiving the signals from the satellite, in certain examples, the electronic device 110 may be deployed in an indoor environment such as inside of a building at a location where the receiver 114 can efficiently (e.g., with good signal strength) receive the signals from the satellite 102, such as near a window or door of the building. In the examples as illustrated herein, the receiver 114 is incorporated into the electronic device 110 as an internal component. Alternatively, in other examples, the receiver 114 may be located remotely and coupled to the electronic device 110 using a dedicated line or port. In certain examples, the electronic device 110 may be any PD that includes a satellite receiver to receive satellite signals from the satellite 102.

The satellite signals received from the satellite 102 may include synchronization information. In an example, the synchronization information includes time information. In some examples, the time information may include pulse per second (PPS) information, time of day information or both the PPS and the time of day information. The synchronization information may also include location information, in some examples.

When the receiver 114 receives a signal (i.e., satellite signal) from the satellite 102, the receiver 114 generates a pulse signal based on the synchronization information included in the received satellite signal. The pulse signal includes a series of pulses that vary between a first logical value and a second logical value over time to reflect the synchronization information. The first logical value may be a high logical value (e.g., value "1") and the second logical value may be a low logical value (e.g., value "0"). In an example, the pulse signal reflects time information included in the synchronization information.

The electronic device 110 includes a modulator 116 coupled to the receiver 114. The modulator 116 includes hardware and/or circuitry, such as circuitry including a load, or another suitable type of hardware and/or circuitry. The modulator 116 may receive the pulse signal from the receiver 114 and modulate a current from a power rail (described below) based on the synchronization information included in the pulse signal received from the receiver. A level pattern of the modulated current may indicate the synchronization information included in the satellite signal received by the receiver 114. The modulated current from the modulator 116 may be received at the first port 112 and transmitted from the first port 112 to the power supply device 120 via the connection 130. In the examples described herein, the modulator 116 may modulate the current based on a certain type of synchronization information, for example, the time information. An example of the modulator 116 and the generation of the modulated current is described below with reference to FIG. 4.

As alluded, the power supply device 120 is configured to supply power (e.g., in the form of PoE) to the electronic device 110. The power supply device 120 is also configured to determine power consumption of the electronic device 110. The power supply device 120 includes a power consumption analyzer 124 that is configured to receive a voltage, across a shunt resistor, corresponding to a given current received from the electronic device 110. In an example, when the power supply device 120 receives the modulated current including the synchronization information from the electronic device 110, the power consumption analyzer 124 receives a modulated voltage, across the shunt resistor, corresponding to the modulated current and recovers the synchronization information from the received modulated voltage. An example of receiving the modulated voltage and recovering the synchronization information by the power consumption analyzer 124 will be described below with reference to FIG. 6. Once the power supply device 120 recovers the synchronization information, the power supply device 120 aligns its local time information based on the synchronization information. As used herein, the term "local time information" may refer to time information in a geographic region or area expressed with reference to a line of longitude (i.e., meridian) passing through it in contrast to that of a time zone within which the geographic region or area is located. In particular, local time information of a power supply device may be time information of a geographic location within which the power supply device is implemented.

In some examples, the synchronization information modulated onto the current by the modulator 116 is in a form of a DC signal. It will be appreciated that by coupling the receiver 114 to the electronic device 110 and modulating a current based on the synchronization information included in the satellite signal in a manner of amplitude modulation enables synchronization between the power supply device 120 and the satellite 102. As such, data (i.e., the synchronization information) will be communicated in a conventional manner between the electronic device 110 and the power supply device 120 without being affected by the modulated current.

Through the above discussion, it will be appreciated that synchronization information may be communicated from an electronic device deployed at locations (e.g., an outdoor environment) suitable to efficiently receive signals from a satellite to a given power supply device deployed in an indoor environment. For example, the electronic device 110 including the receiver 114 can be located outside a shopping mall to receive signals from the satellite 102. The power supply device 120 deployed inside the shopping mall can receive the modulated current including the synchronization information via the connection 130 from the electronic device 110 to synchronize its local time information with the satellite 102. In this way, when all network devices (power supply devices) deployed in an indoor environment are synchronized with the satellite, all the network devices are synchronized.

Figure 3:
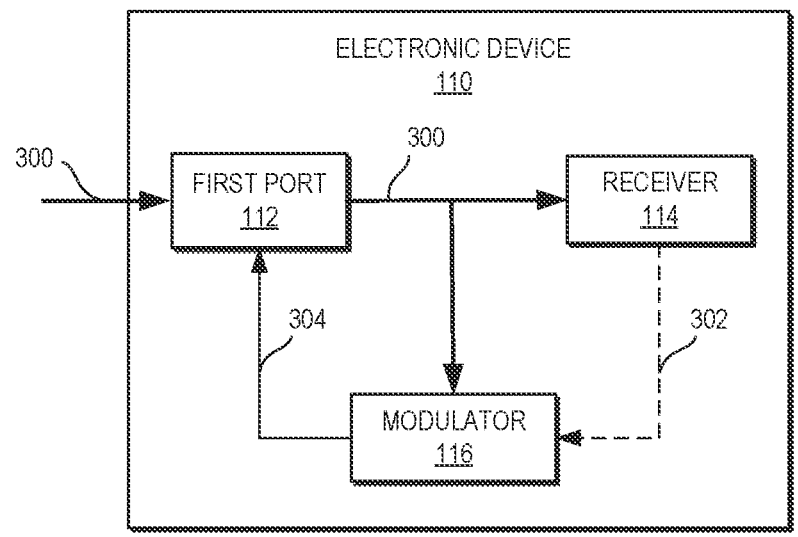
FIG. 3 is a block diagram illustrating an electronic device, in accordance with one example.

FIG. 3 illustrates a block diagram of the electronic device 110, in some examples. The electronic device 110 receives power from a power supply device (e.g., the power supply device 120) through a power rail 300 via the first port 112. Accordingly, a current from the power rail 300 may be, individually, supplied to the receiver 114, the modulator 116 and any other components of the electronic device 110.

Once the receiver 114 receives a signal including synchronization information from the satellite 102, the receiver 114 generates a pulse signal based on the signal and transmits the pulse signal (as shown by dotted arrow 302 and referred to as "the pulse signal 302" hereinafter) to the modulator 116. The modulator 116 receives the pulse signal 302 from the receiver 114 and generates a modulated current (i.e., a first modulated current) based on the synchronization information included in the signal and transmits the modulated current (as shown by arrow 304 and referred to as "the first modulated current 304" hereinafter) to the first port 112. An example of the modulator 116 and the generation of the modulated current is described below with reference to FIG. 4.

Figure 4:
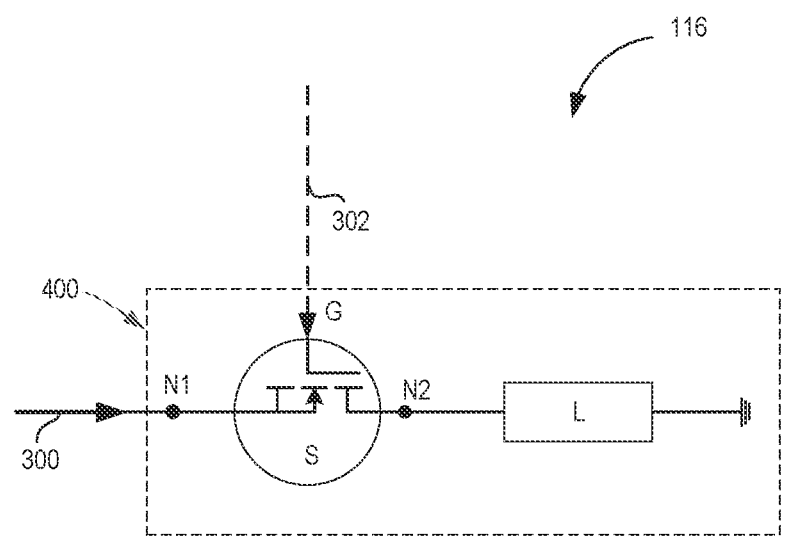
FIG. 4 is a schematic diagram of a modulator included in an electronic device, in accordance with one example.

FIG. 4 illustrates a schematic diagram of the modulator 116, in accordance with some examples. The modulator 116 may modulate a current from the power rail 300 based on the pulse signal 302 received from the receiver 114 (FIG. 3) and transmit the synchronization information included in the pulse signal 302 in the form of a modulated current. As shown, the modulator 116 includes a first circuit 400.

The first circuit 400 includes a switch CS' and a dummy load such as a resistor coupled to the switch S. The switch S is a transistor such as an n-type metal oxide semiconductor field effect transistor (MOSFET), in some examples. The switch S may include any other semiconductor switch as well. A first node N1 of the switch S is coupled to the power rail 300 of the electronic device 110 and receives a current from the power rail 300 when a power is supplied to the electronic device 110. The dummy load L is coupled to a second node N2 of the switch S. A control terminal 'G' of the switch S is configured to receive the pulse signals from the receiver 114.

In some examples, the modulator 116 receives the pulse signal 302 at a first logical value (e.g., a value "1") at a first point in time. In these examples when the pulse signal 302 arriving at the control terminal G is at the first logical value, the switch S transitions to an ON state. The current from the power rail 300 flows through the dummy load L. As a result, power is consumed across the dummy load L, that is referred to, herein, as a first power consumption. The modulator 116 generates a modulated current (referred to as "a first modulated current") corresponding to the first power consumption across the dummy load L and draws the first modulated current from the first node N1 to the first port 112. In such instances, the modulator 116 generates the first modulated current at a first level. A first level of the first modulated current may be a high current for example, 0.5 amperes (Amps). As an example, when the modulator 116 is connected to the power rail 300 to receive a voltage of about 3 volts (V) and consume power of about 1.5 watts (W), the first modulated current is 0.5 Amps.

Referring to FIGS. 3 and 4, in addition to the first modulated current, the electronic device 110 draws a second current corresponding to a second power consumption across its other internal components such as the receiver 114 to the first port 112. As a result, the first port 112 receives the first modulated current corresponding to the first power consumption from the modulator 116 and the second current corresponding to the second power consumption from the other components. The first power consumption and the second power consumption together form a total power consumption of the electronic device 120, in such instances. For example, the total power consumption may be equal to a sum of the first power consumption and the second power consumption.

In an example, a value of the dummy load L of the modulator 116 is selected such that the total power consumption of the electronic device 110 is less than or equal to a maximum power that can be drawn from the power supply device 120 at any point in time. That is, the total power consumption of the electronic device 110 is within a power capability of the power supply device 120. The term power capability may refer to a maximum power that can be supplied by the power supply device 120. For example, if the power capability of the power supply device 120 is 5 W, a total power consumption of the electronic device 110 can be up to 5 W at any point in time. If the second power consumption of the electronic device 110 is 3 W and the total power consumption is 5 W, the first power consumption across the dummy load L may be up to 2 W. In order to maintain the total power consumption of the electronic device 110 within the power capability of 5 W of the power supply device 120, the value (e.g., impedance) of the dummy load L may be chosen such that the first power consumption across the dummy load L is up to 2 W.

In some examples, the modulator 116 may receive the pulse signal 302 at a second logical value (e.g., a value "0") at a second point in time. In these examples when the pulse signal 302 arriving at the control terminal G is at the second logical value, the switch S transitions to an OFF state. In such instances, no current from the power rail 300 may flow through the switch S and the dummy load L. As a result, the modulator 116 generates no modulated current. In these instances, the total power consumption of the electronic device 110 is the second power consumption across other components of the electronic device 110. The electronic device 110 generates the second current corresponding to the second power consumption across the other components and may draw the second current to the first port 112. Accordingly, the first port 112 may receive only the second current, in such instances.

As described above, when the modulator 116 receives the pulse signal 302 at the first logical value at the first point in time, it generates the first modulated current at the first level. When the modulator 116 receives the pulse signal 302 at the second logical value at the second point in time for example, later than the first point in time, it generates no modulated current. When the modulator 116 generates no modulated current, it may be referred to as that the modulator 116 generates the first modulated current at a second level that is below the first level. In the examples described herein, the second level of the first modulated current is zero current. The first and second levels of the first modulated current may be generated in a manner to form a level pattern of the first modulated current.

It will be appreciated that the configuration of the modulator 116 as shown in FIG. 4 is only for illustration, without suggesting any limitations as to the scope of the present disclosure. It could be understood that another configuration for a modulator can also apply, as long as it can generate a modulated electrical signal based on the synchronization information. For example, a modulator may include a circuitry including a LED light source or a temperature monitoring device that can consume a significant current (e.g., 0.5 Amps).

Figure 5:
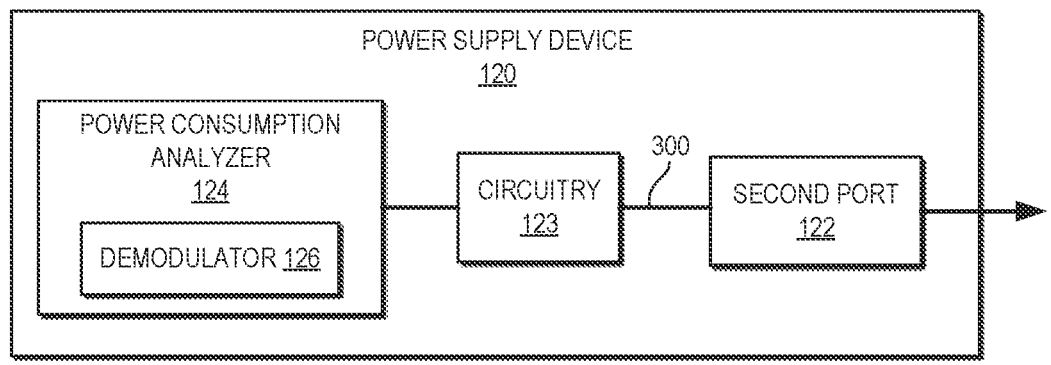
FIG. 5 is a block diagram illustrating a power supply device, in accordance with one example.

FIG. 5 illustrates a block diagram of the power supply device 120, in some examples. As shown, the power supply device 120 includes the second port 122 coupled to a circuitry 123 of the power supply device 120 that supplies power to the electronic device 110 through the power rail 300. The second port 122 is coupled to the connection 130 (FIG. 2). Further, the power consumption analyzer 124 is coupled to the power rail 300 to receive a voltage, across a shunt resister, corresponding to a given current provided from the power rail 300. The power consumption analyzer 124 may be a power module (generally referred to as an intelligent power module (IPM)) that measures power consumed by the electronic device 110. The power consumption analyzer 124 (e.g., the power module) includes hardware and/or circuitry, such as a convertor or a comparator and a processor including hardware and/or circuitry for processing information such as a microprocessor, a microcontroller, or another suitable type of hardware and/or circuitry.

In the examples described herein, the power consumption analyzer 124 is configured to measure/monitor the total power consumption of the electronic device 110 based on a total current, provided from the power rail 300, corresponding to the total power consumption by the electronic device 110. In an example, the power consumption analyzer 124 receives a total voltage, across a shunt resistor, corresponding to the total current including the first modulated current and the second current. The total voltage may include a first modulated voltage corresponding to the first modulated current and a second voltage corresponding to the second current. The power consumption analyzer 124 may include a demodulator 126 to recover synchronization information from the first modulated voltage. Examples of recovering the synchronization information is described below with reference to FIG. 6.

Figure 6:
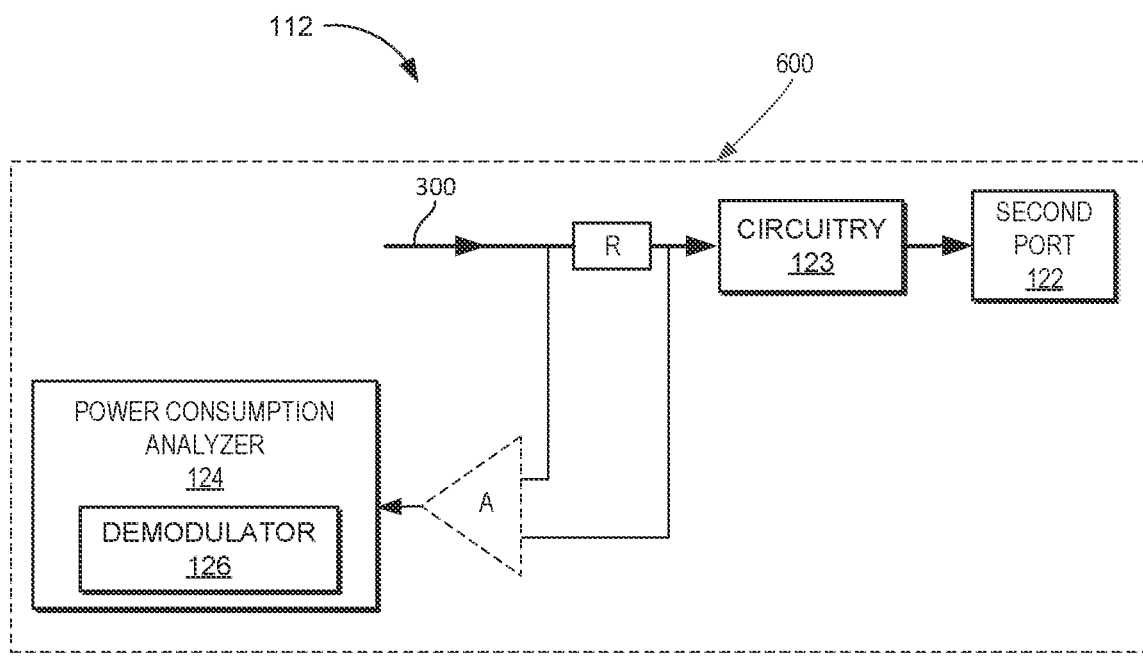
FIG. 6 is a schematic diagram of a power supply device including a power consumption analyzer, in accordance with one example.

FIG. 6 illustrates a schematic diagram of the power supply device 120, in some examples. As shown, the second circuit 600 includes a shunt resistor CR' coupled to the circuitry 123 in series such that a current from the power rail 300 is drawn through the shunt resistor R. The power consumption analyzer 124 is coupled to the shunt resistor R such as to receive a voltage, across the shunt resistor R, corresponding to a given current. In some examples, an amplifier 'A' may be coupled across the shunt resistor R to amplify the voltage received at the power consumption analyzer 124.

In the examples described herein, when the total current corresponding to the total power consumption by the electronic device 110 is received by the power supply device 120 via the connection 130, the power consumption analyzer 124 receives the total voltage across the shunt resistor R corresponding to the total current. In some instances, when the total current includes the first modulated current at the first level (e.g., when the switch S is in the ON state) and the second current, the total voltage across the shunt resistor R corresponding to the total current. The total voltage includes the first modulated voltage at a first level across the shunt resistor R corresponding to the first modulated current at the first level and a second voltage across the shunt resistor R corresponding to the second current. The first level of the first modulated voltage may be a relatively high voltage such as 0.1V, for example. In these instances, the total voltage including the first modulated voltage at the first level and the second voltage is high (e.g., in a range from 0.1V to 0.2V), and is referred to as the total voltage at a first level.

In other instances, when the total current includes the first modulated current at the second level (e.g., when the switch S is in the OFF state) and the second current, the total voltage includes the first modulated voltage at a second level across the shunt resistor R corresponding to the first modulated current at the second level (e.g., the first modulated current is zero) and the second voltage across the shunt resistor R corresponding to the second current. The second level of the first modulated voltage may be a low voltage such as 0V corresponding to the first modulated current at the second level (i.e., no first modulated current). In these instances, the total voltage including the first modulated voltage at the second level (e.g., 0V) and the second voltage is low (e.g., in a range from 0.02V to 0.1V), and is referred to as the total voltage at a second level. The total voltage at the first level is relatively higher than the total voltage at the second level.

The second level of the first modulated voltage is below the first level of the first modulated voltage, and the first and second levels may be generated in a manner to form a level pattern of the first modulated voltage.

The demodulator 126 may include hardware and/or circuitry, such as an A/D converter, a comparator or another suitable type of hardware and/or circuitry for monitoring and processing electrical signals (e.g., voltages). In the examples as illustrated herein, the demodulator 126 may be integrated with the power consumption analyzer 124 into the same hardware component. Alternatively, in other examples, the demodulator 126 may be separate from the power consumption analyzer 124 and coupled to the power consumption analyzer 124 to receive the first modulated voltage from the power consumption analyzer 124.

In some examples, the demodulator 126 includes an A/D converter. The A/D converter is configured to convert the received total voltage into a logical value. In an example, the A/D converter includes a microcontroller unit (MCU). By way of an example, when the A/D converter receives the total voltage at the first level (e.g., in a range from 0.1V to 0.2V), the A/D converter converts the total voltage at the first level into a high logical value (e.g., a value '1'). When the A/D converter receives the total voltage at the second level (e.g., in a range from 0.02V to 0.1V), the A/D converter converts the total voltage at the second level into a low logical value (e.g., a value '0').

In some examples, the demodulator 126 includes a comparator. The comparator may include hardware and/or circuitry that compares two voltages or currents and outputs a digital signal indicating which is larger out of the two voltages or currents or any other type of hardware circuitry. The comparator may be configured to compare the received total voltage with a threshold voltage. A threshold voltage may be a voltage that may be received by the power consumption analyzer 124 across the shunt resistor R corresponding to a current in the power rail 300 when the first power consumption across the dummy load in the electronic device 110 is zero (i.e., the electronic device 110 does not consume any power across the dummy load L). In an example, the threshold voltage is equal to the second voltage received by the power consumption analyzer 124 across the shunt resistor R corresponding to the second current that corresponds to the second power consumption of the electronic device 110. In instances when the comparator receives the total voltage at the first level, the comparator compares the total voltage with the threshold voltage and determines that the total voltage is higher than the threshold voltage because the total voltage includes the first modulated voltage at the first level and the second voltage. The comparator determines the first modulated voltage at the first level from the difference of the total voltage at the first level and the threshold voltage, and recovers a high logical value (e.g., a value '1'). In instances when the comparator receives the total voltage at the second level, the comparator compares the total voltage with the threshold voltage and determines that the total voltage is not higher than the threshold voltage because the total voltage at the second level includes only the second voltage. The comparator determines that the total voltage includes the first modulated voltage at the second level (i.e., does not include the first modulated voltage) and recovers a low logical value (e.g., a value '0').

As described, the demodulator 126 outputs the high logical value if it receives the total voltage of the first level (when the total voltage includes the first modulated voltage at the first level) and outputs the low logical value if it receives the total voltage of the second level (when the total voltage does not include the first modulated voltage). Accordingly, the demodulator 126 converts the received first modulated voltage into a digital signal representing a sequence of the high logical value and the low logical value, which represents the synchronization information. The synchronization information may be recovered from the digital signal.

Figure 7:
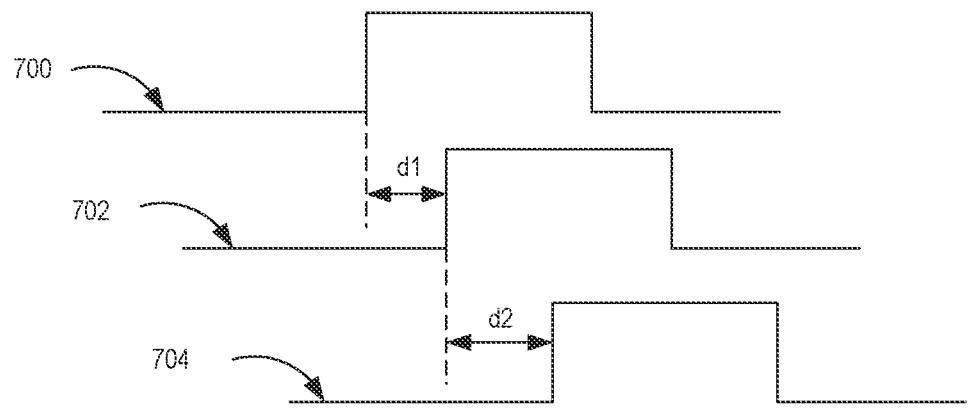
FIG. 7 shows time delays in transmission of a signal from an electronic device to a power supply device, in accordance with one example.

Usually, signal transmission consumes time, even if it is at an order of nanoseconds. Accordingly, the time information demodulated by the power supply device 120 may need to be adjusted to a certain degree to account for the delay(s) of signal transmission. For example, FIG. 7 shows time delays in the transmission of a pulse per second (PPS) from the electronic device 110 to the power supply device 120. In FIG. 7, PPS 700 shows the PPS (in the form of a pulse signal) generated by the receiver 114 of the electronic device 110 based on a signal from the satellite 102, PPS 702 shows the PPS received by the modulator 116 from the receiver 114 and PPS 704 shows the PPS (in the form of digital signal) recovered by the demodulator 126 based on the first modulated voltage. A first time delay 'd1' for the transmission of the PPS from the receiver 114 (PPS 700) to the modulator 116 (PPS 702) may be caused by a cable of the receiver 114, which can easily be calculated based on the length of the cable. In addition, a second time delay 'd2' for the transmission of the PPS from the modulator 116 (PPS 702) to the demodulator 126 and received from the demodulator 126 (PPS 704) may be caused by the first circuit 400 of the modulator 116 to the power supply device 120, the connection 130 and the A/D converter of the demodulator 126. The second time delay d2 may be stable and predictable due to the simplicity of the circuit structures of the first circuit 400 and the A/D convertor. The time information received from the demodulator 126 (PPS 704) can be corrected by subtracting a total time delay (d1+d2) from the received time information. In some examples, the total time delay (d1+d2) may be predetermined by measurements, and this predetermined time delay may be subtracted for example, using an adjustor, from the time information recovered from the power consumption analyzer 124 to obtain a corrected time information. In some examples, this corrected time information may be highly accurate to time information received by the receiver 114 from the satellite 102. In an example, the total time delay (d1+d2) is less than 50 ns. In certain examples, the total time delay (d1+d2) is approximately 15 ns. Accordingly, the accuracy of the corrected time information is high.

Once the power supply device 120 obtains the corrected time information, the power supply device 120 uses the corrected time information to align its local time information to the corrected time information. Once the local time information is aligned to the corrected time information, the power supply device 120 is said to be synchronized with the satellite 102.

It will be appreciated that another type of synchronization information (e.g., location information) can be communicated from the electronic device 110 to the power supply device 120 through an Ethernet cable using Ethernet package protocols.

Figure 8:
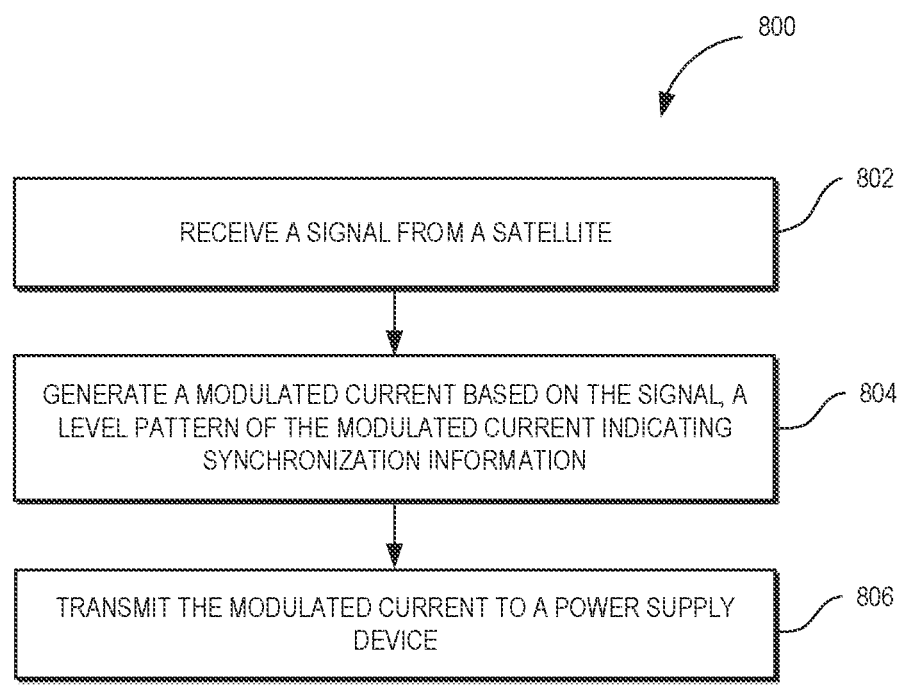
FIG. 8 is a flowchart illustrating a method for transmitting synchronization information, in accordance with one example.

FIG. 8 illustrates a method 800 for transmitting synchronization information in accordance with some examples. The method 800 can be carried out by an electronic device (e.g., the electronic device 110 of FIGS. 2-4) and is described with reference to FIGS. 2-4. The features described above with respect to the electronic device 110 can apply to the method 800. While only a few blocks are shown in the method 800, the method 800 may include other actions described herein.

At block 802, the receiver 114 of the electronic device 110 receives a signal from the satellite 102. In an example, the receiver 114 generates a pulse signal based on the received signal from the satellite 102 and transmits the pulse signal to the modulator 116. The pulse signal includes synchronization information included in the signal. Further, at block 804, the modulator 116 generates a modulated current (i.e., the first modulated current). A level pattern of the first modulated current indicates the synchronization information included in the signal of the satellite 102. Furthermore, at block 806, the electronic device 110 transmits the first modulated current to the power supply device 120 to enable synchronization between the satellite 102 and the power supply device 120 based on the synchronization information.

Figure 9:
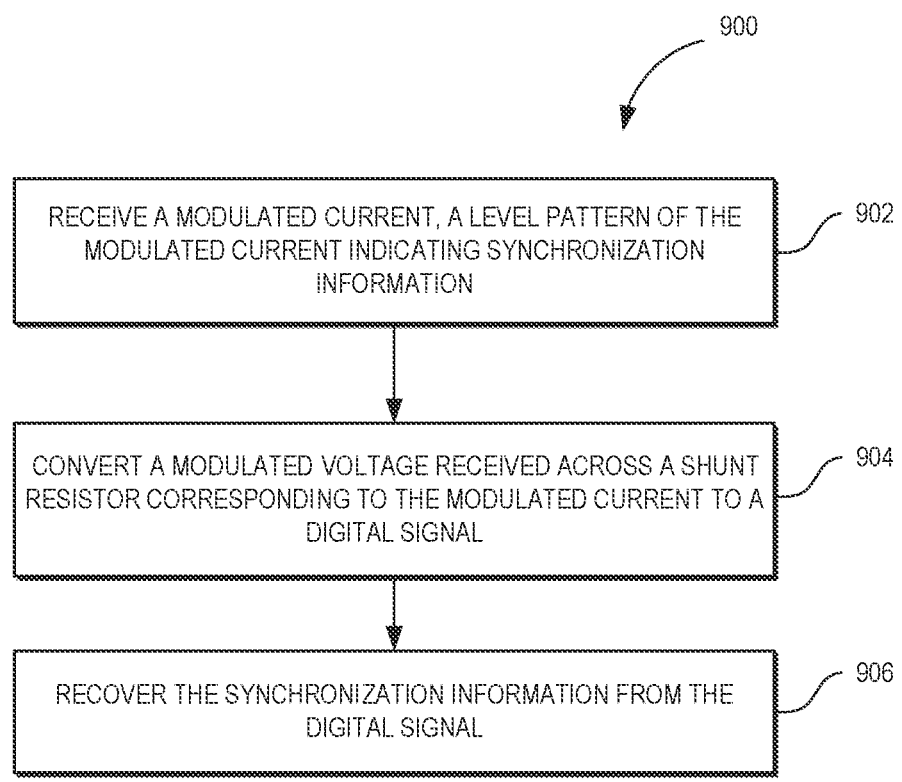
FIG. 9 is a flowchart illustrating a method for recovering synchronization information received by a power supply device, in accordance with one example.

FIG. 9 illustrates a method 900 for synchronizing a power supply device, in accordance with some examples. The method 900 can be carried out by a power supply device (e.g., the power supply device 120 of FIGS. 2, 5 and 6) and is described with reference to FIGS. 2, 5 and 6. The features described above with respect to the power supply device 120 can apply to the method 900. While only a few blocks are shown in the method 900, the method 900 may include other actions described herein.

At block 902, the power supply device 120 receives the first modulated current from the electronic device 110 via the connection 130. Further, at block 904, the power consumption analyzer 124 of the power supply device 120 converts a first modulated voltage received across the shunt resistor R corresponding to the first modulated current to a digital signal. A level pattern of the first modulated voltage indicates the synchronization information included in the signal of the satellite 102. Furthermore, at block 906, the power supply device 120 recovers the synchronization information from the digital signal. Once the power supply device 120 recovers the synchronization information, the power supply device 120 is synchronized with the satellite 102 based on the synchronization information. For example, the power supply device 120 recovers the corrected time information based on the synchronization information and aligns local time information to the corrected time information.

It will be appreciated that while operations are depicted in a particular order, this should not be understood as requiring that such operations be performed in the particular order described or shown or in sequential order, or that all illustrated operations be performed, to achieve desirable results. In certain circumstances, multitasking and parallel processing may be advantageous. Certain features that are described in the context of separate examples may also be implemented in combination in a single implementation. Conversely, various features that are described in the context of a single implementation may also be implemented in multiple examples separately or in any suitable sub-combination.

What is claimed is:

1. A power supply device comprising:
a port to receive, from a modulator, a modulated current corresponding to a power consumption across a dummy load, wherein a level pattern of the modulated current is indicative of synchronization information received from a satellite; and
a power consumption analyzer configured to receive a modulated voltage, across a shunt resistor, corresponding to the modulated current and recover, from the modulated voltage, the synchronization information to enable synchronization between the satellite and the power supply device based on the synchronization information.

2. The power supply device of claim 1, wherein the synchronization information comprises time information.

3. The power supply device of claim 1, wherein the power consumption analyzer comprises a demodulator to recover, from a level pattern of the modulated voltage, the synchronization information.

4. The power supply device of claim 3, wherein the demodulator comprises an analog-to-digital convertor to convert the modulated voltage to a digital signal and recover, from the digital signal, the synchronization information.

5. The power supply device of claim 3, wherein the demodulator comprises a comparator configured to compare the modulated voltage with a predetermined voltage to recover the synchronization information.

6. An electronic system comprising the power supply device of claim 1 and an electronic device comprising the modulator.

7. An electronic system comprising:
an electronic device comprising:
a receiver to receive a signal including synchronization information from a satellite and generate a pulse signal based on the synchronization information;
a modulator configured to receive the pulse signal from the receiver and generate a modulated current corresponding to a power consumption across a dummy load, wherein a level pattern of the modulated current indicates the synchronization information included in the signal; and
a first port to receive the modulated current from the modulator; and
a power supply device coupled to the electronic device via the first port comprising:
a second port to receive, from the first port of the electronic device, the modulated current; and
a power consumption analyzer configured to receive a modulated voltage across a shunt resistor corresponding to the modulated current and recover the synchronization information from a level pattern of the modulated voltage.

8. The electronic system of claim 7, wherein the modulator comprises a circuit comprising:
a transistor coupled between a first node provided with a current from a power rail of the electronic device and a second node, wherein the transistor is configured to receive the pulse signal at a control terminal of the transistor; and
the dummy load coupled between the second node and a ground.

9. The electronic system of claim 8, wherein:
when the transistor receives a first voltage of a first level of the pulse signal at the control terminal, the modulator provides the modulated current to the first port.

10. The electronic system of claim 7, wherein the power consumption across the dummy load is such that a total power consumption of the electronic device that includes the power consumption across the dummy load and another power consumption across one or more components of the electronic device is less than or equal to a maximum power drawn from the power supply device.

11. The electronic system of claim 7, wherein the power consumption analyzer comprises a demodulator to recover, from the level pattern of the modulated voltage, the synchronization information.

12. The electronic system of claim 11, wherein the demodulator comprises an analog-to-digital convertor to convert the modulated voltage to a digital signal and recover, from the digital signal, the synchronization information.

13. The electronic system of claim 7, wherein the synchronization information comprises time information.

14. A method comprising:

receiving, by a power supply device, a modulated current from an electronic device corresponding to a power consumption across a dummy load, wherein a level pattern of the modulated current is indicative of synchronization information included in a signal received at the electronic device from a satellite; and recovering, by the power supply device and from a level pattern of a modulated voltage across a shunt resistor corresponding to the modulated current, the synchronization information to enable synchronization between the satellite and the power supply device based on the synchronization information.

15. The method of claim 14, further comprising:

generating, by the electronic device, the modulated current based on the signal received from the satellite; and transmitting, by the electronic device, the modulated current to the power supply device.

16. The method of claim 14, further comprising:

converting, by the power supply device, the modulated voltage to a digital signal; and recovering, by the power supply device from the digital signal, the synchronization information.

* * * * *